United States Patent
Audi et al.

(10) Patent No.: US 12,460,427 B2
(45) Date of Patent: Nov. 4, 2025

(54) DUAL-PURPOSE PROGRESSIVE STAGE LOAD-DISTRIBUTING AND ABSORBING SYSTEM

(71) Applicant: VICONIC SPORTING LLC, Dearborn, MI (US)

(72) Inventors: Richard Francois Audi, Dearborn, MI (US); Joel Matthew Cormier, Lathrup Village, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 289 days.

(21) Appl. No.: 17/854,604

(22) Filed: Jun. 30, 2022

(65) Prior Publication Data
US 2024/0003143 A1    Jan. 4, 2024

(51) Int. Cl.
| | |
|---|---|
| *E04F 15/22* | (2006.01) |
| *E04F 15/10* | (2006.01) |
| *E04F 15/18* | (2006.01) |
| *F16F 7/12* | (2006.01) |
| *E01C 13/02* | (2006.01) |

(52) U.S. Cl.
CPC .......... *E04F 15/225* (2013.01); *E04F 15/107* (2013.01); *E04F 15/185* (2013.01); *E04F 15/22* (2013.01); *F16F 7/121* (2013.01); *E01C 13/02* (2013.01); *E04F 2290/044* (2013.01)

(58) Field of Classification Search
CPC . E04F 15/225; E04F 15/107; E04F 2290/044; E04F 15/22; E04F 15/185; E04F 13/02; E01C 13/02; B60R 21/04; B60R 2021/0414; B60R 2021/0421; F16F 7/121
See application file for complete search history.

(56) References Cited

U.S. PATENT DOCUMENTS

| | | |
|---|---|---|
| 1,784,511 A | 12/1930 | Carns |
| 1,958,050 A | 5/1934 | Koppelman |
| 1,995,728 A | 3/1935 | Aldrich |
| 2,090,881 A | 8/1937 | Wilson |
| 2,225,067 A | 12/1940 | Marin |
| 2,275,575 A | 3/1942 | Vrooman |
| 2,349,907 A | 5/1944 | Kos et al. |

(Continued)

FOREIGN PATENT DOCUMENTS

| | | |
|---|---|---|
| EP | 1422344 | 5/2004 |
| EP | 2154291 | 2/2010 |

(Continued)

OTHER PUBLICATIONS

US 7,624,546, 01/12/2009, Moller Jr. (withdrawn).

*Primary Examiner* — Brent W Herring
(74) *Attorney, Agent, or Firm* — Brooks Kushman P.C.

(57) ABSTRACT

A multi-purpose progressive stage load distributing and absorbing system that lies below a superstructure material that is exposed to percussive forces. The progressive stage load distributing and absorbing system is interposed between the superstructure material and a foundation. The system has a barrier layer that lies below the superstructure material and an underlayment infrastructure positioned below the barrier layer. Included in the underlayment infrastructure are hat-shaped absorbing members that have a relatively compliant region and one or more relatively stiff regions.

16 Claims, 5 Drawing Sheets

(56) References Cited

U.S. PATENT DOCUMENTS

| | | |
|---|---|---|
| 2,391,997 A | 1/1946 | Noble |
| 2,434,641 A | 1/1948 | Burns |
| 2,924,419 A | 2/1960 | Wells |
| 3,011,602 A | 12/1961 | Ensrud et al. |
| 3,018,015 A | 1/1962 | Norton et al. |
| 3,071,216 A | 1/1963 | Jones et al. |
| 3,108,924 A | 10/1963 | Mountford |
| 3,196,763 A | 7/1965 | Rushton |
| 3,204,667 A | 9/1965 | Zahorski |
| 3,231,454 A | 1/1966 | Joseph |
| 3,525,663 A | 8/1970 | Hale |
| 3,597,891 A | 8/1971 | Martin |
| 3,605,145 A | 9/1971 | Graebe |
| 3,802,790 A | 4/1974 | Blackburn |
| 3,828,715 A | 8/1974 | Matsushita |
| 3,834,487 A | 9/1974 | Hale |
| 3,871,636 A | 3/1975 | Boyle |
| 3,876,492 A | 4/1975 | Schott |
| 3,933,387 A | 1/1976 | Salloum et al. |
| 3,938,963 A | 2/1976 | Hale |
| 3,980,221 A | 9/1976 | Okada |
| 3,997,207 A | 12/1976 | Norlin |
| 4,029,280 A | 6/1977 | Golz |
| 4,029,350 A | 6/1977 | Goupy et al. |
| 4,190,276 A | 2/1980 | Hirano et al. |
| 4,233,793 A | 11/1980 | Omholt |
| 4,321,989 A | 3/1982 | Meinzer |
| 4,352,484 A | 10/1982 | Gertz et al. |
| 4,413,856 A | 11/1983 | McMahan et al. |
| 4,497,853 A | 2/1985 | Tomarin |
| 4,530,197 A | 7/1985 | Rainville |
| 4,631,221 A | 12/1986 | Disselbeck et al. |
| 4,635,981 A | 1/1987 | Friton |
| 4,666,130 A | 5/1987 | Denman et al. |
| 4,696,401 A | 9/1987 | Wallace |
| 4,710,415 A | 12/1987 | Slosberg et al. |
| 4,720,261 A | 1/1988 | Fishwick et al. |
| 4,739,762 A | 4/1988 | Palmaz |
| 4,755,416 A | 7/1988 | Schneider et al. |
| 4,757,665 A | 7/1988 | Hardigg |
| 4,844,213 A | 7/1989 | Travis |
| 4,869,032 A | 9/1989 | Geske |
| 4,879,857 A | 11/1989 | Peterson et al. |
| 4,890,877 A | 1/1990 | Ashtiani-Zarandi et al. |
| 4,909,661 A | 3/1990 | Ivey |
| 4,980,877 A | 12/1990 | Sugiyama et al. |
| 5,030,501 A | 7/1991 | Colvin et al. |
| 5,033,593 A | 7/1991 | Kazuhito |
| 5,054,753 A | 10/1991 | Polus |
| 5,085,424 A | 2/1992 | Wood, Jr. |
| 5,141,279 A | 8/1992 | Weller |
| 5,165,990 A | 11/1992 | Nakano |
| 5,192,157 A | 3/1993 | Laturner |
| 5,306,066 A | 4/1994 | Saathoff |
| 5,364,682 A | 11/1994 | Tanaka et al. |
| 5,383,314 A | 1/1995 | Rothberg |
| 5,390,467 A | 2/1995 | Shuert |
| 5,391,251 A | 2/1995 | Shuert |
| 5,399,406 A | 3/1995 | Matsuo et al. |
| 5,401,347 A | 3/1995 | Shuert |
| 5,435,619 A | 7/1995 | Nakae et al. |
| 5,444,959 A | 8/1995 | Tesch |
| 5,500,037 A | 3/1996 | Alhamad |
| 5,518,802 A | 5/1996 | Colvin et al. |
| 5,551,673 A | 9/1996 | Furusawa et al. |
| 5,573,272 A | 11/1996 | Teshima |
| 5,619,832 A | 4/1997 | Myrvold |
| 5,636,866 A | 6/1997 | Suzuki et al. |
| 5,660,426 A | 8/1997 | Sugimori et al. |
| 5,679,967 A | 10/1997 | Janai et al. |
| 5,700,545 A | 12/1997 | Audi et al. |
| 5,727,826 A | 3/1998 | Frank et al. |
| 5,744,763 A | 4/1998 | Iwasa et al. |
| 5,762,392 A | 6/1998 | Suga |
| 5,833,386 A | 11/1998 | Rosan et al. |
| 5,972,477 A | 10/1999 | Kim et al. |
| 6,017,084 A | 1/2000 | Carroll, III et al. |
| 6,044,606 A | 4/2000 | Hamar |
| 6,199,942 B1 | 3/2001 | Carroll, III et al. |
| 6,205,728 B1 | 3/2001 | Sutelan |
| 6,221,292 B1 | 4/2001 | Carroll, III |
| 6,247,745 B1 | 6/2001 | Carroll, III et al. |
| 6,315,339 B1 | 11/2001 | Devilliers et al. |
| 6,318,755 B1 | 11/2001 | Nusser et al. |
| 6,443,513 B1 | 9/2002 | Glance |
| 6,547,280 B1 | 4/2003 | Ashmead |
| 6,679,544 B1 | 1/2004 | Hubbert et al. |
| 6,682,128 B2 | 1/2004 | Carroll, III et al. |
| 6,687,907 B1 | 2/2004 | Bortolini |
| 6,715,592 B2 | 4/2004 | Suzuki et al. |
| 6,752,450 B2 | 6/2004 | Carroll, III et al. |
| 6,763,322 B2 | 7/2004 | Potyrailo et al. |
| 6,777,062 B2 | 8/2004 | Skaja |
| RE38,745 E | 6/2005 | Foster |
| 6,938,290 B2 | 9/2005 | McKinney et al. |
| 7,033,666 B2 | 4/2006 | Skaja |
| 7,143,876 B2 | 12/2006 | Tamada et al. |
| 7,163,244 B2 | 1/2007 | Meltzer |
| 7,249,662 B2 | 7/2007 | Itou |
| 7,309,188 B2 | 12/2007 | Ianniello et al. |
| 7,338,038 B2 | 3/2008 | Maurer et al. |
| 7,360,822 B2 | 4/2008 | Carroll, III et al. |
| 7,377,577 B2 | 5/2008 | Carroll, III et al. |
| 7,384,095 B2 | 6/2008 | Cormier et al. |
| 7,416,775 B2 | 8/2008 | Snel |
| 7,441,758 B2 | 10/2008 | Coffield et al. |
| 7,488,523 B1 | 2/2009 | Muncaster et al. |
| 7,566,489 B2 | 7/2009 | Starke |
| 7,574,760 B2 | 8/2009 | Foley et al. |
| 7,575,796 B2 | 8/2009 | Scott et al. |
| 7,625,023 B2 | 12/2009 | Audi et al. |
| 7,690,160 B2 | 4/2010 | Moller, Jr. |
| 7,810,291 B2 | 10/2010 | McPherson |
| 7,866,248 B2 | 1/2011 | Moore, III et al. |
| 7,900,416 B1 | 3/2011 | Yokubison et al. |
| 7,908,802 B2 | 3/2011 | Frederiksen |
| 7,958,681 B2 | 6/2011 | Moller, Jr. |
| 8,061,098 B2 | 11/2011 | Whelan et al. |
| 8,146,310 B2 | 4/2012 | Keene |
| 8,221,856 B2 | 7/2012 | Stroppiana |
| 8,353,640 B2 | 1/2013 | Sawyer |
| 8,458,987 B2 | 6/2013 | Becker |
| 8,465,087 B2 | 6/2013 | Gerwolls et al. |
| 8,528,280 B2 | 9/2013 | Coil et al. |
| 8,568,840 B2 | 10/2013 | Sawyer et al. |
| 8,726,424 B2 | 5/2014 | Thomas et al. |
| 8,777,191 B2 | 7/2014 | Kligerman et al. |
| 8,782,989 B2 | 7/2014 | Tang |
| 8,789,340 B2 | 7/2014 | Dixon et al. |
| 8,915,339 B2 | 12/2014 | Kanous et al. |
| 8,919,054 B2 | 12/2014 | Tillery et al. |
| 8,919,069 B2 | 12/2014 | Bird et al. |
| 8,998,298 B2 | 4/2015 | Gerwolls et al. |
| 9,194,136 B2 | 11/2015 | Cormier et al. |
| 9,249,853 B2 | 2/2016 | Cormier et al. |
| 9,260,823 B2 | 2/2016 | Craven |
| 9,279,258 B2 | 3/2016 | Cormier et al. |
| 9,394,702 B2 | 7/2016 | Cormier et al. |
| 9,420,843 B2 | 8/2016 | Cormier et al. |
| 9,462,843 B2 | 10/2016 | Cormier et al. |
| 9,528,280 B2 | 12/2016 | Cormier et al. |
| 9,622,534 B2 | 4/2017 | Cormier et al. |
| 9,644,699 B2 | 5/2017 | Cormier et al. |
| 9,739,053 B2 | 8/2017 | Cormier et al. |
| 10,047,484 B2 | 8/2018 | Sawyer |
| 10,156,045 B2 | 12/2018 | Penland et al. |
| 10,220,736 B2 | 3/2019 | Cormier et al. |
| 10,369,739 B2 | 8/2019 | Cormier et al. |
| 10,378,220 B2 | 8/2019 | Paul et al. |
| 10,982,451 B2 * | 4/2021 | Cormier ............ E04F 15/02038 |
| 2003/0154676 A1 | 8/2003 | Schwartz |
| 2003/0177729 A1 | 9/2003 | Sabados |
| 2005/0133324 A1 | 6/2005 | Soto Bailon et al. |
| 2007/0267261 A1 | 11/2007 | Toccalino et al. |

(56) References Cited

U.S. PATENT DOCUMENTS

| | | |
|---|---|---|
| 2008/0176010 A1 | 7/2008 | Sawyer et al. |
| 2009/0165414 A1 | 7/2009 | Burk et al. |
| 2010/0203292 A1 | 8/2010 | Seth et al. |
| 2010/0313510 A1 | 12/2010 | Tang |
| 2011/0072748 A1 | 3/2011 | Simonson et al. |
| 2014/0007761 A1 | 1/2014 | Haidar |
| 2015/0059276 A1 | 3/2015 | Valentine |
| 2016/0053498 A1* | 2/2016 | Brown ............... E04F 15/02183 52/403.1 |
| 2016/0123021 A1 | 5/2016 | Cormier et al. |
| 2018/0073254 A1 | 3/2018 | Hainbach et al. |
| 2018/0080235 A1 | 3/2018 | Downey et al. |
| 2018/0148937 A1* | 5/2018 | Brown ............... E04F 15/02183 |
| 2018/0202150 A1 | 7/2018 | Downey et al. |
| 2019/0136548 A1 | 5/2019 | Jang et al. |
| 2020/0141132 A1* | 5/2020 | Cormier ................ A47G 27/02 |
| 2020/0149292 A1 | 5/2020 | Downey et al. |

FOREIGN PATENT DOCUMENTS

| | | |
|---|---|---|
| FR | 2209867 | 7/1974 |
| JP | 08085404 | 4/1996 |
| JP | 9150692 | 6/1997 |
| JP | 11348699 | 12/1999 |
| KR | 101011907 | 2/2011 |
| KR | 101363159 | 2/2014 |
| WO | 8203099 | 9/1982 |
| WO | 93/00845 | 1/1993 |
| WO | 97/11825 | 4/1997 |
| WO | 00/31434 | 6/2000 |
| WO | 2006/038029 | 4/2006 |
| WO | 2013/183989 | 12/2013 |

* cited by examiner

DUAL-PURPOSE PROGRESSIVE STAGE LOAD-DISTRIBUTING AND ABSORBING SYSTEM

BACKGROUND OF THE INVENTION

(1) Field of the Invention

Several aspects of this disclosure relate to a dual-purpose progressive stage, multi-tiered load-distributing and absorbing system, primarily for comfort underfoot and injury protection following a fall in environments exposed to foot traffic, such as but not limited to eldercare or senior living facilities.

(2) Background

In environments that are subjected to foot traffic, it would be desirable to have a load absorbing and distributing system that receives percussive impacts and reduces impact forces. Such a system would provide comfort in walking or standing, yet reduce the potential risk of injury associated with fall-related impacts. Potential benefits include reducing injury risk due to falls on the flooring surface, minimizing system cost, maintaining system durability, facilitating installation, and abating noise while offering surface quality and comfort for both patients and caregivers.

Among the art considered in preparing this patent application is commonly owned U.S. Pat. No. 10,982,451. That document discloses (see, e.g., col. 5, lines 50-54; FIGS. 5-6) alternative embodiments of a compliant stage subsystem, including a lobe feature and a star-shaped feature. From the viewpoints of manufacturing ease and efficiency, it would be desirable to make a compliant stage with a flat top. The '451 patent is incorporated by reference herein.

BRIEF SUMMARY OF THE INVENTION

To meet such needs, a dual-purpose progressive load-distributing and absorbing system is provided that offers comfort underfoot and injury protection following a fall in any environment that is exposed to foot traffic. Nonlimiting examples of such an environment include an elder care facility, a hospital, an infant playground, and a factory floor. In a preferred embodiment, one version of the system resembles an inverted wedding cake and lies below a flooring material that is exposed to percussive or point-applied forces. The progressive load-distributing and absorbing system is interposed between the flooring material and a foundation.

To cover an area of intended use, one form of progressive load-distributing and absorbing system has one or more tiles. At least some of the tiles have a barrier layer that lies below the flooring material. Below the barrier layer lies one or more multi-tier, comfort-providing hat-shaped absorbing members. The tiers are separated by shoulder portions. At least some of the hat-shaped absorbing members in a tier have a basal portion that is positioned adjacent to the foundation, and a curvilinear wall extending upwardly from the basal portion.

The curvilinear wall has a relatively soft, compliant, comfort region proximate the basal portion. Above the comfort region, there is a relatively stiff protective region having one or more tiers. A shoulder portion separates the comfort and stiff regions in a tier and separates multiple tiers (if present) in the stiff region. From the side, a sectional view of a representative embodiment may resemble an inverted wedding cake.

The comfort region has shorter, thinner walls than the stiffer region. And provides a soft footfall while having a relatively lower resistance to percussive or point-applied forces, In contrast, the stiffer, protective region has a relatively higher resistance to the percussive or point-applied forces transmitted by the protective region, thereby providing protection from an injury sustained from a fall above the flooring material. It will be appreciated that the protective region deflects after the comfort region in response to the load.

As noted earlier, shoulder portions define a transition region between tiers or layers of the protective region. A shoulder portion also lies between the comfort and lowermost protective region to provide an area of difference between resistance offered by the protective and comfort regions.

Lying below the barrier layer in one tier is a ceiling portion that extends from the protective region and bridges opposing walls.

After the percussive or point-applied forces no longer impact the flooring material. the curvilinear walls return to their pre-impact configuration and strength.

Desirable features of an underlayment system for impact protection are comfort and vibration damping underfoot. The ideal underlayment product would provide enhanced comfort underfoot while affording enhanced impact protection. In this context, the system disclosed herein offers a dual purpose.

Against this background, it would be desirable to develop a progressive stage load distribution and absorption system that underlies a superstructure material such as a flooring system to mitigate injuries and soften footfalls, while reducing noise and vibration where possible.

Ideally, such a system would be relatively low cost and present a low profile to minimize tripping, yet be durable. In several embodiments, an underlayment infrastructure would be compatible with a superstructure material such as sheet vinyl and carpet.

In some embodiments, such progressive load-absorbing systems offer a first and one or more subsequent levels of reaction to an impacting load. The reaction varies from an initially relatively compliant stage deflecting and then transforms to a gradually stiffer response to further load absorption. This behavior tends to offer a padded response to for example a heavy footfall or a tumbling patient. As a result, foot traffic may be comfortable, yet serious injury may be lessened or avoided.

Several embodiments contemplate one or more progressive stage load distributing and absorbing tiles that are positioned side-by-side. At least some of the tiles have a barrier layer that lies below the superstructure material-primarily to distribute, rather than absorb an impacting force, such as a heavy footfall. To cushion the blow, a load absorbing underlayment infrastructure is positioned below the barrier layer.

The underlayment infrastructure in a typical tile has one or more progressive stage, multi-tiered "hat-shaped" (defined below) absorbing members. In a preferred embodiment, each of those members has a relatively stiff initial load transmission subsystem that preferably lies below and next to the barrier layer. This subsystem first transmits forces from the hit to another stiff tier or to a relatively compliant stage absorbing subsystem. In this disclosure, "relatively"

broadly refers to the relative stiffness of the stiff and compliant absorbing subsystems in response to a hit. The compliant subsystem may be lowermost (preferably), or in some embodiments be uppermost. After the compliant subsystem deflects and perhaps bottoms out, the primary role of one or more layers in the stiff stage absorbing subsystem reverts to load absorption, rather than load transmission.

Consider a relatively stiff force transmission subsystem that primarily transmits, rather than absorbs energy. As noted earlier, it preferably lies below the barrier layer. Below that subsystem is a basal portion that preferably is positioned adjacent to the foundation.

The basal portion originates as a sheet material that is preferably thermoformed to produce the stiff and compliant progressive stage absorbing members that constitute the disclosed infrastructure. Alternative manufacturing methods include compression molding, casting, vacuum forming, and injection molding.

In at least some of the stiff stage progressive absorbing members, a curvilinear wall extends from the ceiling toward the foundation. Preferably, such a wall has a draft angle (O, FIG. 1) that lies between about 4 and 40 degrees. This wall has a top region extending from the ceiling and a bottom region proximate to the base. In several embodiments, the shoulder portions in the multi-tiered arrangement extend outwardly and upwardly from the comfort layer.

Following impact upon the superstructure, ignoring optional adhesives, a load is transmitted across the barrier layer initially to the stiff stage subsystem of a first tier of the progressive stage absorbing members of the underlayment infrastructure. Such load travels through the wall of the stiff stage absorbing subsystem. It then reaches across a shoulder, and then to another tier in the stiff stage, and so on until the load reaches a compliant tier before impinging on the foundation.

If there is a rebound or recoil, such loads are delivered back to the stiff stage, which then assumes a more compliant role rather than its former load-transmission role. In such walls, load absorption is achieved by the wall bending inwardly or outwardly (akin to columnar buckling), to or toward an un-deflected position. After the load is lessened, for example, if the foot traveler moves on, or if a fallen patient is lifted and re-located, the curvilinear wall reverts to its undeflected configuration without loss of strength.

One result of these subsystems cooperating in the described manner is that the compliant stage absorbing subsystem deflects before one or more of the stiffer transmission stage absorbing subsystems in response to the load. The relatively stiff subsystem is available to absorb what remains of the impacting load after the compliant stage has deflected or bottomed out. Consequently, footfalls are softened, vibration is lessened, noise is reduced and injury after a fall is mitigated.

Accordingly, several embodiments of this disclosure include a dual-purpose, multi-tiered progressive stage load distributing and progressive stage energy absorbing system that lies below a superstructure material that is exposed to continual or intermittent percussive loads. Often, such forces may cause high localized pressure, such as when forces from a wheelchair are exerted through narrow wheels.

In the underlayment infrastructure, load absorption and distribution are mainly provided by groups of progressive stage absorbing members positioned in tiles (described below). Tiles are united by the inter-engagement of overlapping barrier layers that overhang the ceilings of adjacent tiles.

BRIEF DESCRIPTION OF THE SEVERAL VIEWS OF THE DRAWINGS

FIGS. 1 (A)-(C) are vertical sectional views of one embodiment of a multi-purpose, multi-tiered, progressive stage load distributing and absorbing underlayment system. They illustrate the progressive collapse of a comfort (relatively soft) layer or tier in a multi-tiered arrangement and reversion to an undeflected configuration after a load has been relieved.

FIGS. 2 (A)-(D) illustrate progressive collapse, first of the comfort (relatively soft) layer, and then of a protective (relatively stiff) layer or tier in response to load application and relief, plus reversion to an undeflected configuration.

FIGS. 3 (A)-(C) illustrate reversion of the multi-purpose, progressive stage load distributing and absorbing system after load relief, showing that in one embodiment, the comfort layer recovers before the protective layer.

FIGS. 4 (A-(F) illustrate schematically the response of a single comfort layer positioned below a multi-tier stiff stage embodiment to load application and relief.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ alternative embodiments of this disclosure.

This disclosure includes a multi-purpose, multi-stage progressive stage load distributing and absorbing system 10 (FIG. 1) that lies below a superstructure material 12 which is exposed to steady or intermittent percussive forces, such as a footfall, a rolling bed, a wheelchair, or a falling patient in an eldercare facility. In some embodiments, system 10 resembles an inverted wedding cake. The progressive stage load distributing and absorbing system 10 is interposed between a superstructure material (such as tile or carpeting, for example) 12 and a foundation 16 below.

Several embodiments have tiles that are populated by a collection of one or more progressive stage load distributing and absorbing systems At least some of the tiles have a barrier layer 18 that lies below the superstructure (flooring) material 12. The barrier layer 18 primarily distributes laterally and downwardly, rather than absorbing an impacting load, such as a heavy footfall or a rolling wheelchair. To cushion the blow, mute noise, and deaden vibration, an underlayment infrastructure (like an inverted wedding cake, as described more fully later) 20 is positioned below the barrier layer 18.

Figure 1:
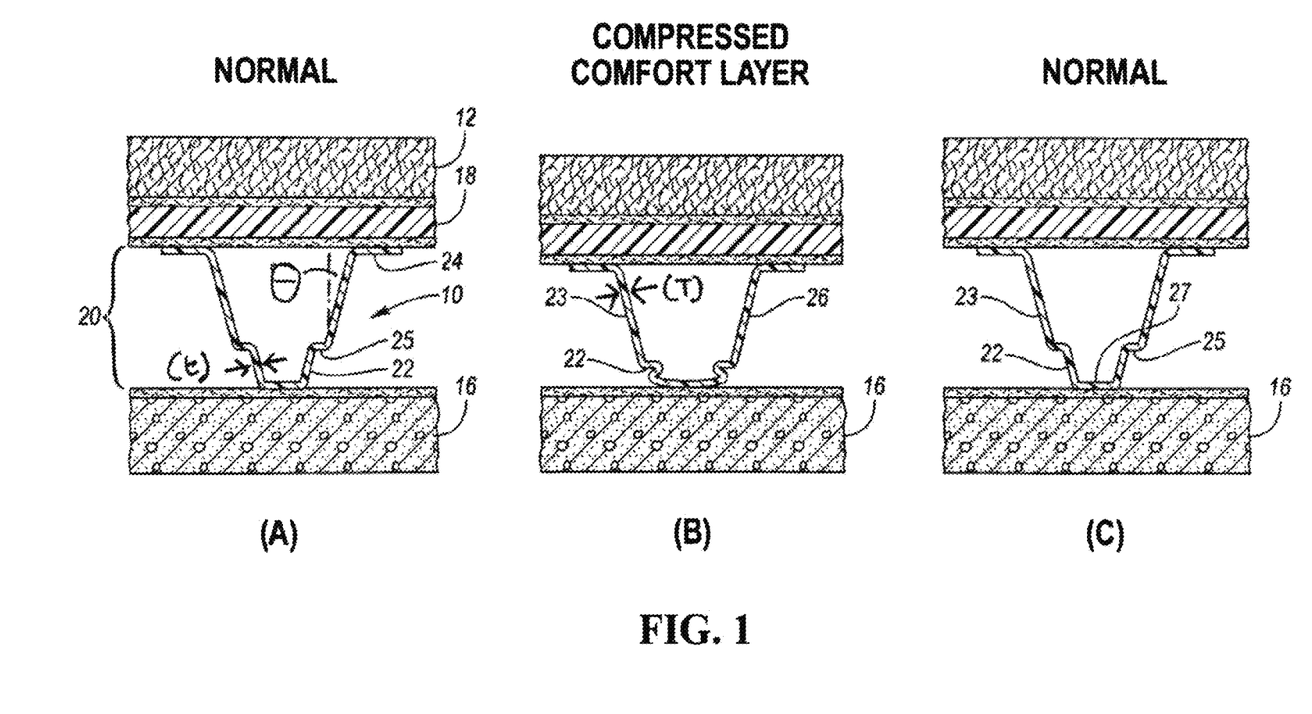

The underlayment infrastructure 20 has one or more progressive stage hat-shaped (defined below) absorbing members (FIG. 1). One or more of those absorbing members 21 have a relatively stiff or protective load transmission subsystem 23 that delivers force to a compliant (softer) stage absorbing subsystem 22, which is the first subsystem to deflect. Preferably, but not necessarily, the compliant stage 22 absorbing subsystem lies adjacent to the foundation 16. In other embodiments, the compliant stage 22 may lie adjacent to the barrier layer 18.

Extending from the stiff force transmission (and later, residual force-absorbing) subsystem 23 is a ceiling portion 24 that in several embodiments is positioned adjacent to the barrier layer 18 (FIG. 1). The basal portion 27 originates as a sheet material that is preferably thermoformed to produce the progressive stage absorbing members 21 that constitute the disclosed infrastructure 20.

Figure 4:
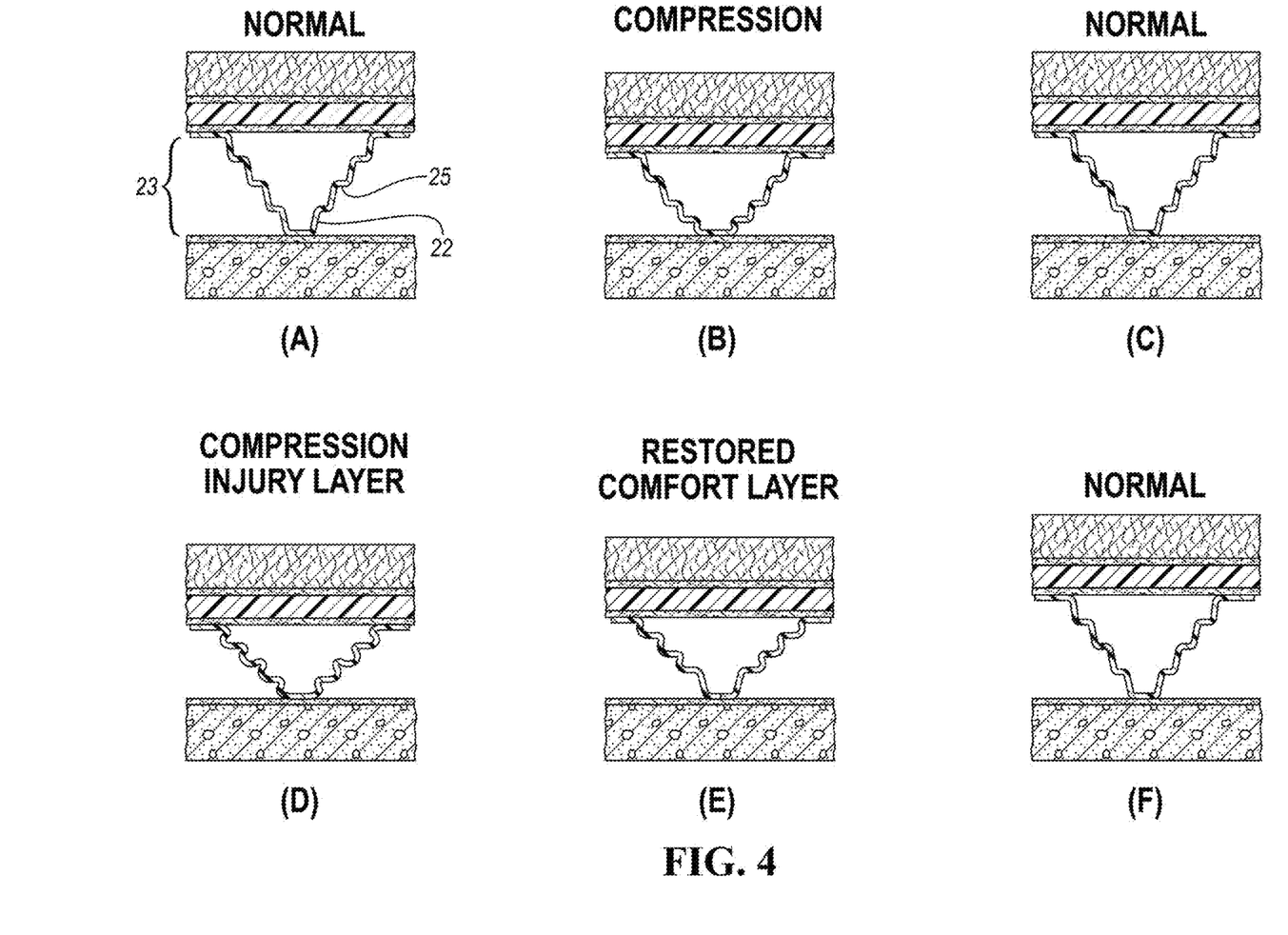
Figure 5:
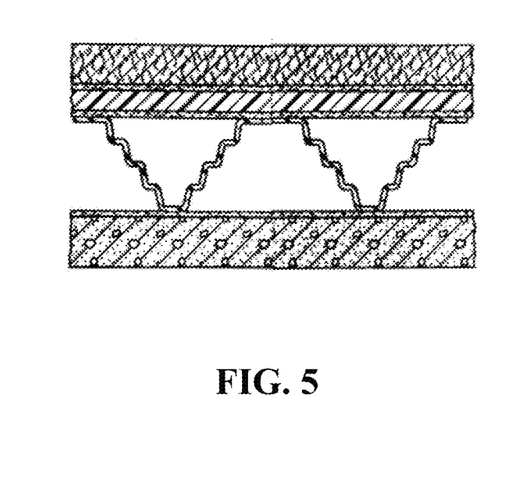
FIG. 5 is a cross sectional view which illustrates two energy absorbing members of equal height in a tile before compression.

A curvilinear wall 26 extends from the ceiling portion 24 toward the foundation 16. In this context, "curvilinear" means curved when viewed from above or below and substantially linear before impact when viewed from the side. This wall 26 has a top region extending from the ceiling portion 24 and a bottom region at the opposite end portion of wall 26. In several embodiments, a shoulder portion 25 separates a compliant stage 22 from a protective region 23. A shoulder portion 25 also separates successive wall portions that define the protective subsystem 23 (FIG. 4).

After impact, loads are transmitted across the barrier layer 18 to one or more tiers of the stiff force transmission subsystem 23, and then to the compliant stage absorbing subsystem 22, in many embodiments towards the foundation 16.

In general, the walls or tiers of the protective region 23 are higher than the wall of the compliant region 22. A radius may be associated with a transition region between a wall portion and a shoulder. In general, a large radius permits more flow of semi-fluid material in a thermoforming step. Lower resistance to an applied load for the "drawn feature" (e.g., compliant stage 22) is offered compared to a "host feature" (e.g., stiff stage 23). The wall of the compliant stage 22 is usually thinner and shorter than the wall of a tier in the protective region 23.

Separating each of the absorbing members laterally in a tile is the ceiling portion 24, i.e., the substantially unchanged portion of the sheet that enters the thermoforming process. The curvilinear wall 26 extends therefrom. A base 27 lies across the lower portion of the curvilinear wall 26.

Such a structure could be installed so that base 27 is positioned adjacent to the barrier layer 18. In this inverted configuration, the "ceiling" portion 24 is positioned adjacent to the foundation 16. Note that the plane (or ceiling or floor portion) of each member 21 is flat (i.e., it lacks a drawn feature, such as a lobe or star-shaped feature that are disclosed in U.S. Pat. No. 10,982,451) and lies parallel to the foundation 16.

Consider FIG. 1(A). It shows that the system itself, at a minimum, bears the weight of the superstructure 12 and barrier layer 18. Under an initial applied load (e.g., a footfall), the compliant stage 22 (weaker members) begin compressing and absorbing a portion of the total load exerted (FIG. 1(B). The protective region 23 at first remains substantially undeflected. Compression of the compliant stage continues until the shoulder 25 above the compliant stage 22 abuts the foundation. At that stage, the force required to compress the system further is greater than that required to compress the compliant stage 22. After the light load (e.g. a footfall) is removed, the system reverts to its undeflected state (FIG. 1(C)).

The compression characteristics of the taller and shorter members 21 can be tuned by selecting the material type, material thickness, draw depth, and the like to develop characteristics that enhance comfort underfoot, dampen vibrations, or absorb sound.

Figure 2:
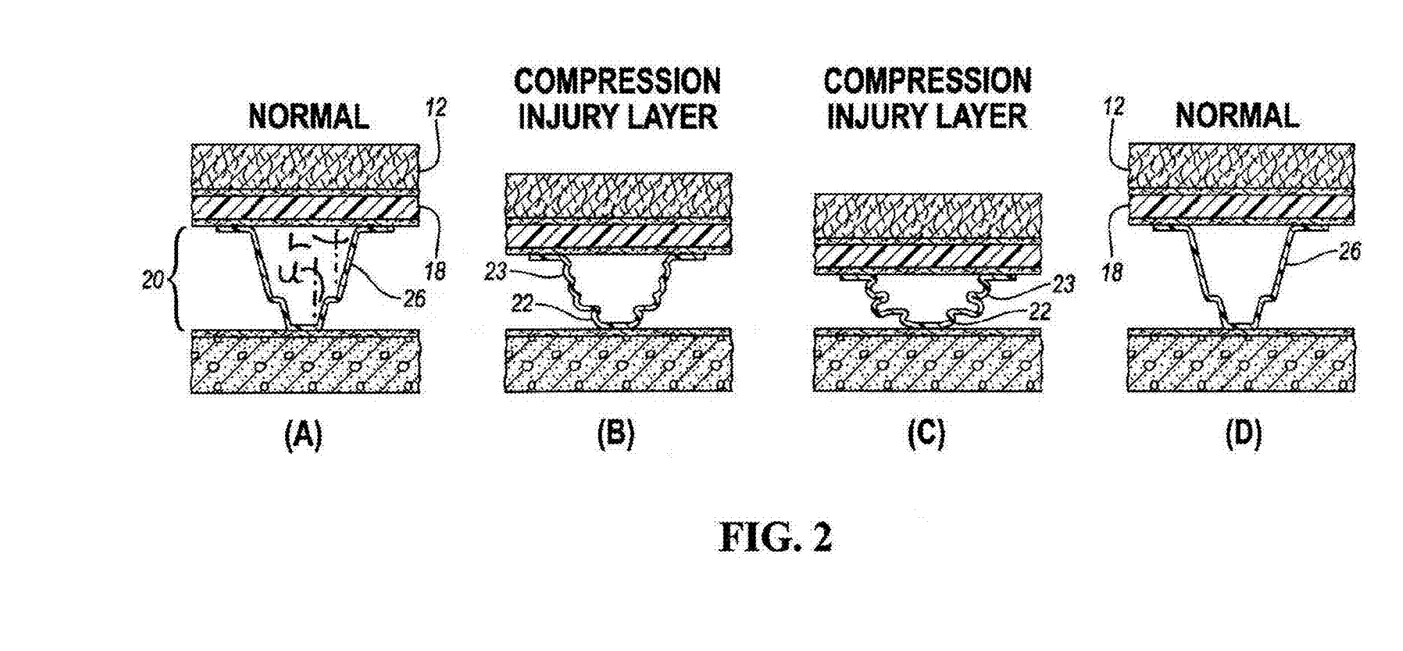

The third section (C) in FIG. 2 shows the response of the system to an even higher applied load. Under this load level, which is likely at a level tuned to reduce the risk of a fall injury, both the taller and shorter members collapse-first the compliant region 22, and then one or more tiers in the stiff stage 23) in a controlled manner to absorb the impact load.

In each embodiment of the system, there is a progressive collapse of wall sections from the weakest to the strongest. However, after the softer region bottoms out, there is an additional level of crush resistance that is provided by the stiffer, injury-protection region 23.

Alternative embodiments include absorbing member shapes beyond those depicted (e.g., those having a wall that is not curvilinear, but having a drawn feature in the associated member base 27 or ceiling 24). Such a wall may be curved for instance, when viewed from the side in an undeflected condition. If desired, ribs may be provided for added stiffness between load absorbing members. Further, arrays of members may be arranged in a configuration that is other than hexagonal. In some applications and environments, materials may be selected that are other than thermoplastic polyurethane and polycarbonate.

Figure 3:
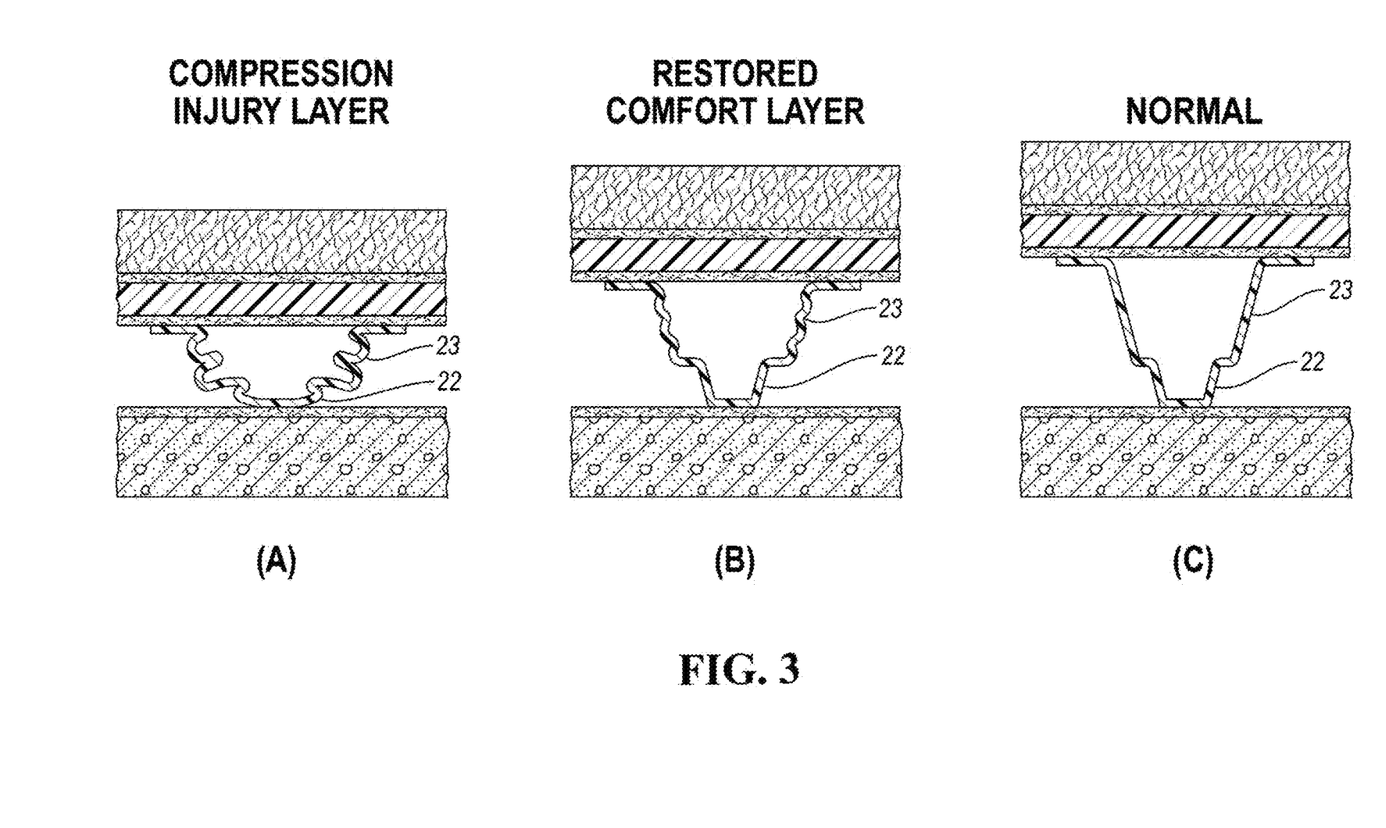

FIGS. 1-3 illustrate how a system with one compliant region 22 and one stiffer region tier 23 responds to a heavier load, e.g., a rolling bed, a wheelchair, or a fallen patient. In such cases, the load can be imagined to exceed the crush strength of the compliant stage 22. FIG. 1(B) illustrates how a representative absorbing system according to the present disclosure reacts to the initial onset of applied forces. The compliant system 22 is the first region to deflect, followed by deflection of the stiffer (protective) region 23 (FIG. 2(B)-(C)). One deflection mechanism is columnar buckling. After the load is removed (FIG. 2(D), the system reverts to an undeflected state, with the compliant stage 22 usually being the first to bounce back. One attribute of the system is that successive hits and reversions to an undeflected state occur without weakening the system.

In some cases, the barrier layer 18 is affixed to one or more of the ceilings 24 and/or the base 27 is secured to the foundation 16 by means for securing 55 such as an adhesive or by mechanical means including screws, rivets, pins, and the like.

As used herein the term "hat-shaped" includes frusto-conical, which may or may not be inverted, as described above. Such hat-shaped members 22 may have a top wall portion that has a footprint that is circular, oval, elliptical, a cloverleaf, a race-track, or some other rounded shape with a curved perimeter. Similarly, for a bottom wall portion of an absorbing member 21. As used herein the term "hat-shaped" includes shapes that resemble those embodied in at least these hat styles: a boater/skimmer hat, a bowler/Derby hat, a bucket hat, a cloche hat, a fedora, a fez, a gambler hat, a homburg hat, a kettle brim or up-brim hat, an outback or Aussie hat, a panama hat, a pith helmet, a porkpie hat, a top hat, a steam punk hat, a safari hat or a trilby hat. See, e.g., https://www.hatsunlimited.com/hat-styles-guide, which is incorporated by reference.

As used herein the terms "hat-shaped" and "frusto-conical" exclude structures that include a ridge line or crease in a continuous curvilinear wall 26 associated with an absorbing member 21, because such features tend to promote stress concentration and lead to probable failure over time when exposed to percussive blows. They tend to concentrate, rather than distribute or absorb incident forces.

When viewed laterally, the curvilinear wall 26 appears substantially linear or straight before being subjected to an impact that may reign through the superstructure 12 on a barrier layer 18. When viewed from above or below, the footprint of the bottom portion or top portion may appear circular, elliptical, oval, or resemble a clover leaf, a race track, or some other rounded shape with a curved perimeter.

The absorbing members 21 may be manufactured from a resilient thermoplastic and be formed into frusto-conical or hat-shaped members that protrude from a basal sheet 24 which before exposure to a forming process is substantially flat.

In one preferred embodiment, the barrier layer 18 is made from a strong thin layer of polycarbonate (PC), a composite or a metal or other suitable rigid material, the absorbing member 21 is made from resilient thermoplastic polyurethane (TPU), and the means for securing 55 is provided by a pressure-sensitive adhesive (PSA) which bonds well to both the PC and TPU.

Thus, an underlayment infrastructure 20 is created by the juxtaposition of a barrier layer 18 and an underlying infrastructure of progressive stage absorbing members 21.

An assembly of absorbing members 21 may assume a hexagonal array. With an overlying barrier layer 18, the absorbing members may form a tile 17. Adjacent tiles are inter-engaged by overlapping and underlapping edges of the barrier layer 18. Preferably, a small, but acceptable, gap exists between barrier layers 18 associated with adjacent tiles to accommodate thermal expansion and facilitate installation.

If desired, a means for securing, such as an adhesive can be applied to one or both surfaces prior to the application of pressure which then adhesively attaches a barrier layer 18 to underlying absorbing members 21 in a tile. An underlayment infrastructure 20 is thus assembled when the edges of adjacent tiles are brought into registration through the inter-engagement of mating registration features of adjacent edges of associated barrier layers 18.

While a pressure-sensitive adhesive is a preferred embodiment of means for securing a barrier layer 18 to the basal portion 22 or ceiling 24 of a tile, alternatives for attaching overlapped tiles together through their associated barrier layers 18 include mechanical means for attaching such as Velcro®, tape, rivets, etc.

The overlap of the barrier layers 18 and proximity of the absorbing members 22 on adjacent tiles distributes a load applied to the barrier layer 18 over a broad area. Loads are evenly distributed when applied either on a seam between adjacent tiles or within a tile. Loads are at least partially absorbed by flexure and possible rebound of the compliant and stiff stages in the absorbing members.

In more detail, selected features of the disclosed progressive load distributing and absorbing system include:

A: Engineered Performance Consistency

Traditional flooring systems, which are installed over rigid surfaces such as concrete, tend to have little energy absorbing capabilities, thereby posing a risk for fall related injuries. Due the rigid nature of their construction, they do however provide a consistent surface in terms of firmness and stability under foot. A rigid surface such as a foundation supports the flooring product over its entire area. This is essential for products like ceramic tile, glass tile, wood flooring, and the like.

One challenge in developing, installing, and maintaining an attractive, yet compliant flooring system that reduces the risk of injury lies in engineering the system to maintain a consistent firmness and stability over the entire flooring surface throughout its normal life cycle while being compliant. The system must balance compliance needs, yet accommodate other activities like walking, running, rolling in a wheelchair, and supporting other items such as furniture, equipment, and other objects. An ideal load-distributing and absorbing system needs to be firm and stable under foot under such normal activities and at the same time be engineered to deflect or stroke to the greatest degree possible during a potentially injurious fall or impact event.

Additionally, the layers of the load-distributing and absorbing system need to work in concert in order to maintain an attractive appearance after years of repeated wear and abuse. Ideally, the system needs to remain unblemished before, during, and after impact events and everyday activities.

B: Enhanced Load Distributing and Absorbing Flooring System

Thermoforming begins with a basal sheet of material of constant thickness. The thermoplastic raw material is heated to the softening point and then stretched over a form tool via vacuum, pressure, and mechanical means. The thickness of the thermoformed part is a function of the base raw material thickness, raw material type, form temperature, and tool geometry, which includes depth of the draft, and draft angle. Also influential, as noted earlier, are the radii of curvature between a base and a compliant section wall. Also, the radius of curvature between a compliant section wall and a shoulder influences thickness and energy-absorbing behavior. Another factor is the radius between compliant region wall thickness and one or more associated shoulders. Generally, areas where the depth of draw is greatest, the material is stretched in multiple directions. This results in thinner wall profiles than areas that experience less stretching.

Load absorbing members typically have a thicker ceiling and floor, while there is substantial thinning in the curvilinear wall. These members produce a generally "square wave" force versus displacement response to an applied load. There is an initial ramp up in force until the wall buckles and then maintains a relatively constant reaction force to the applied load throughout the available stroke.

Testing has demonstrated that use of various embodiments of the disclosed system may lead to a:

20-fold reduction in risk of critical head injury;
60% reduction in the probability of moderate head injury;
3-fold reduction in GMAX;
2.5-fold reduction femoral neck force during falls for average older females;
3-fold increase in force reduction;
2.5-fold reduction in energy restitution;
firm and stable and stable surface that supports mobility;
substantially more comfort underfoot for caregivers and older adults.

Test data also indicate that the proposed progressive stage load distributing and absorbing systems have the potential to substantially reduce the risk of injury and improve the quality of life for both older adults and caregivers.

| TABLE OF REFERENCE NUMBERS | |
|---|---|
| Reference No. | Component |
| 10 | Progressive stage load distributing and absorbing system |
| 12 | Superstructure material |
| 16 | Foundation |
| 18 | Barrier layer |
| 20 | Underlayment infrastructure |
| 21 | Absorbing member |
| 22 | Compliant stage absorbing subsystem |
| 23 | Stiff stage absorbing subsystem |
| 24 | Ceiling |

-continued

TABLE OF REFERENCE NUMBERS

| Reference No. | Component |
|---|---|
| 25 | Shoulder portion |
| 26 | Curvilinear wall |
| 27 | Base |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A progressive load-distributing and absorbing system, the system lying below a flooring material that is exposed to percussive or point-applied forces, the system being interposed between the flooring material that overlies a barrier layer and a foundation, the system comprising:
   one or more tiles, at least some of the tiles having
   a plurality of multi-tier, hat-shaped absorbing members to reduce noise and vibration and offer a multi-stage, progressive response to the forces, at least some of the absorbing members having
   a planar basal portion lying within an absorbing member, the basal portion extending uninterruptedly between opposing edge portions of a curvilinear wall associated with the absorbing member, all planar basal portions in a tile being of equal height before compression, the tile being devoid of absorbing members that have planar basal portions of unequal heights,
   the curvilinear wall extending from the basal portion, the curvilinear wall having a compliant region proximate the basal portion, a protective region extending from the compliant region, and a shoulder between the compliant region and the protective region, the shoulder defining a transition region and communicating absorption and rebound forces between the protective and compliant regions to communicate a graduated change in resistance offered by the protective and compliant regions,
   the compliant region providing a soft footfall with a wall thickness (t) and a draft angle (U) degrees before compression and having a relatively lower resistance to the percussive or point-applied forces,
   the protective region having a relatively higher resistance to the percussive or point-applied forces with a wall thickness (T) and a draft angle (L) degrees before compression, thereby providing protection from injury sustained from a fall above the flooring material, where (T)>(t) and (L) is greater than (U),
   wherein the protective region may deflect after the compliant region in response to the load, and
   one or more of the tiles having a ceiling portion extending between absorbing members in a tile, the ceiling portion supporting and separating the absorbing members in a tile,
   wherein the curvilinear walls return to their pre-impact configuration and strength non-destructively after the percussive or point-applied forces no longer impact the flooring material, the compliant region bouncing back before the protective region.

2. The progressive stage load-distributing and absorbing system of claim 1, wherein the barrier layer is selected from the group consisting of a ceramic tile, solid wood, a wood composite, a carpet, a carpet tile, sheet vinyl, a vinyl tile, a rigid vinyl tile, a rubber sheet, a rubber tile, a grating, an anti-slip metallic surface including a material selected from the group consisting of a rigid thermoplastic, a composite and a metal.

3. The progressive stage load-distributing and absorbing system of claim 1, wherein the foundation is selected from the group consisting of a concrete, a gravel, a metal and a hardwood.

4. The progressive stage load-distributing and absorbing system of claim 1, further including a means for securing positioned between (A) the barrier layer and a ceiling, or (B) the basal portion and the foundation or in a position that includes (A) and (B).

5. The progressive stage load-distributing and absorbing system of claim 1, wherein a compliant region has a footprint with a shape selected from the group consisting of a circle, an oval, an ellipse, a cloverleaf, a race-track, and other curved perimeters.

6. The progressive stage load-distributing and absorbing system of claim 1, wherein a protective region has a footprint with a shape selected from the group consisting of a circle, an oval, an ellipse, a cloverleaf, a race-track, and other curved perimeters.

7. The progressive stage load-distributing and absorbing system of claim 1, further including one or more tiles of underlayment infrastructures, wherein the barrier layer of a first tile extends from an edge thereof and overhangs at least some of the ceiling portions of an adjacent tile.

8. The progressive stage load-distributing and absorbing system of claim 7, wherein a group of tiles are conjoined, at least some of the absorbing members having a load-attenuation characteristic such that within the group, there is a user-determinable force attenuation property that may be uniform or varied within the group.

9. The progressive stage load-distributing and absorbing system of claim 8, wherein a group of conjoined tiles has an energy absorption characteristic that differs from another group of conjoined tiles, so that tiles that underlie a nursing station may present a softer footfall than a group of tiles that underlie a bed frame.

10. The progressive stage load-distributing and absorbing system of claim 1, wherein the ceiling portion between adjacent progressive stage absorbing members in a tile has a length that is greater than a base.

11. The progressive stage load-distributing and absorbing system of claim 1, wherein the flooring material includes:
   a surface selected from the group consisting of a floor located in a senior living or elder care facility, a hospital or out-patient facility, a daycare floor; and flooring material in homes and residences.

12. The progressive stage load-distributing and absorbing system of claim 1, wherein a curvilinear wall has multiple tiers in the protective region.

13. The progressive stage load-distributing and absorbing system of claim 1, further including
   a small radius feature between a compliant region and a base, and
   a larger radius feature between a shoulder and a tier in the protective region, so that semi-solid material may flow in a thermoforming step more readily between a shoulder and a tier in the protective region than between a compliant region and a base, thereby creating a thinner wall in the compliant region than in the protective region.

14. The progressive stage load-distributing and absorbing system of claim 1, wherein the flooring material includes:
   a material selected from the group consisting of a floor surface located in a senior living or elder care or daycare facility; a hospital or out-patient facility; a home or residence; and a marine environment, including boating decks and docks;
   a sports-playing surface;
   a walking/running track;
   a golf playing surface;
   a soccer, rugby, lacrosse, or football field;
   a stairway;
   a work mat;
   a work platform;
   an anti-fatigue mat;
   an enhanced comfort mat;
   a wall protection material;
   a playground;
   a military blast mat; and
   a seat in a military vehicle that may detonate a land mine.

15. The progressive stage load-distributing and absorbing system of claim 1, wherein a curvilinear wall has multiple tiers in the compliant region.

16. A method for making flooring material in an elder care facility safer by providing a progressive load-distributing and absorbing system that softens a fall thereupon, thereby lessening forces and consequences of impact, the system lying below the flooring material and a barrier layer that lies below the flooring material, the flooring material being exposed to percussive or point-applied forces occasioned by such influences as a falling patient, a rolling bed or a wheelchair, the system being interposed between the barrier layer and a foundation, the method comprising the steps of:
   laying one or more tiles of multi-tier, hat-shaped absorbing members between the foundation and the flooring material,
   the absorbing members having planar basal portions of equal height in a tile before compression, each tile being devoid of absorbing members with planar basal portions of unequal heights,
   each planar basal portion extending uninterruptedly between opposing edge portions of a curvilinear wall within an absorbing member, the basal portion in one orientation being positioned adjacent to the foundation, or in another orientation being positioned adjacent to the barrier layer;
   each curvilinear wall in an absorbing member extending from the basal portion, the curvilinear wall having a compliant region proximate the basal portion, a protective region extending from the compliant region, and a shoulder between the compliant region and the protective region, the shoulder defining a transition region between the protective and compliant regions to provide an area of difference between resistance offered by the protective and compliant regions,
   forming the absorbing members so that the protective region has a wall thickness (T) with a draft angle before compression of (L) degrees and the compliant region has a wall thickness (t) with a draft angle of (U) degrees, such that (T)>(t) and (L)>(U);
   enabling the compliant region to provide a soft footfall by the compliant region being provided with a relatively lower resistance to the percussive or point-applied forces;
   enabling the protective region to provide relatively higher resistance in comparison to the resistance offered by the compliant region to the percussive or point-applied forces, thereby protecting from an injury sustained from a fall above the flooring material,
   so that the protective region deflects after the compliant region in response to the load, and at least some curvilinear walls return to their pre-impact configuration and strength after the percussive or point-applied forces no longer impact the flooring material, the compliant region bouncing back before the protective region.

* * * * *